(12) United States Patent
Thies

(10) Patent No.: US 9,221,229 B2
(45) Date of Patent: Dec. 29, 2015

(54) APPARATUS AND METHOD FOR PRODUCING TUBULAR SECTIONS FOR MANUFACTURING BAGS

(75) Inventor: Joerg Christian Thies, Dissen (DE)

(73) Assignee: WINDMOELLER & HOELSCHER KG, Lengerich (DE)

( * ) Notice: Subject to any disclaimer, the term of this patent is extended or adjusted under 35 U.S.C. 154(b) by 397 days.

(21) Appl. No.: 13/642,628

(22) PCT Filed: May 16, 2011

(86) PCT No.: PCT/EP2011/057844
§ 371 (c)(1),
(2), (4) Date: Oct. 22, 2012

(87) PCT Pub. No.: WO2011/144555
PCT Pub. Date: Nov. 24, 2011

(65) Prior Publication Data
US 2013/0040796 A1 Feb. 14, 2013

(30) Foreign Application Priority Data

May 19, 2010 (DE) .......................... 10 2010 029 139

(51) Int. Cl.
| | |
|---|---|
| *B31B 1/14* | (2006.01) |
| *B31B 1/16* | (2006.01) |
| *B31B 19/00* | (2006.01) |
| *B31B 37/00* | (2006.01) |
| *B31B 1/25* | (2006.01) |

(Continued)

(52) U.S. Cl.
CPC .............. *B31B 19/00* (2013.01); *B23K 26/0807* (2013.01); *B23K 26/0846* (2013.01); *B23K 26/381* (2013.01); *B23K 26/406* (2013.01); *B23K 26/4065* (2013.01); *B31B 2219/022* (2013.01); *B31B 2219/145* (2013.01); *B31B 2219/94* (2013.01)

(58) Field of Classification Search
CPC ............ B31B 1/14; B31B 1/16; B31B 19/00; B31B 37/00; B23K 15/00
USPC ........... 493/186, 239, 51, 227, 231, 233, 234, 493/241, 63, 64
See application file for complete search history.

(56) References Cited

U.S. PATENT DOCUMENTS 3,592,372 A * 7/1971 James et al. ..................... 226/22
3,850,724 A * 11/1974 Lehmacher ................... 156/201

(Continued)

FOREIGN PATENT DOCUMENTS

| DE | 100 38 104 | 3/2002 |
|---|---|---|
| DE | 10 2005 052129 | 12/2006 |

(Continued)

*Primary Examiner* — Andrew M Tecco
*Assistant Examiner* — Praachi M Pathak
(74) *Attorney, Agent, or Firm* — Jacobson Holman, PLLC

(57) ABSTRACT

A device for generating hose sections, which include paper, to produce bags, has an unwinding device with which a web can be unwound from a roll, a perforation device with which perforations can be inserted into the web extending perpendicular relative to the travel direction of the web, a hose forming device which is arranged. downstream in the production process relative to the perforation device and with which the edges of the web can be made to overlap to form a hose, and a separating device for hose sections. The perforation device includes a laser beam device with which a laser beam can be guided to the web in order to insert the perforations.

14 Claims, 4 Drawing Sheets

(51) Int. Cl.
  *B23K 26/08* (2014.01)
  *B23K 26/38* (2014.01)
  *B23K 26/40* (2014.01)

(56) References Cited

U.S. PATENT DOCUMENTS

| | | | | |
|---|---|---|---|---|
| 3,909,582 A | * | 9/1975 | Bowen | 219/121.69 |
| 3,966,524 A | * | 6/1976 | Lehmacher | 156/182 |
| 4,109,792 A | * | 8/1978 | Greenawalt et al. | 206/525 |
| 4,611,799 A | * | 9/1986 | Nuttin | 270/52.01 |
| 4,854,929 A | * | 8/1989 | Szuba | 493/150 |
| 4,958,477 A | * | 9/1990 | Winkler | 53/138.3 |
| 5,103,621 A | * | 4/1992 | Matsumoto | 53/556 |
| 5,165,314 A | * | 11/1992 | Paulson et al. | 83/29 |
| 5,357,731 A | * | 10/1994 | Conway et al. | 53/374.4 |
| 5,421,805 A | * | 6/1995 | Baxter et al. | 493/226 |
| 5,733,236 A | * | 3/1998 | De Smedt | 493/8 |
| 6,038,487 A | | 3/2000 | Balster et al. | |
| 6,191,382 B1 | * | 2/2001 | Damikolas | 219/121.62 |
| 7,214,173 B2 | * | 5/2007 | Barclay et al. | 493/213 |
| 9,099,511 B2 | * | 8/2015 | Rumsby | 1/1 |
| 2004/0132599 A1 | * | 7/2004 | Colla | 493/11 |
| 2010/0029455 A1 | * | 2/2010 | Skopek et al. | 493/224 |
| 2011/0143901 A1 | * | 6/2011 | Thies | 493/227 |
| 2012/0035036 A1 | * | 2/2012 | Pease | 493/264 |
| 2012/0241419 A1 | * | 9/2012 | Rumsby | 219/121.6 |
| 2013/0008849 A1 | * | 1/2013 | Gehwolf et al. | 210/493.5 |
| 2013/0040796 A1 | * | 2/2013 | Thies | 493/239 |

FOREIGN PATENT DOCUMENTS

| | | |
|---|---|---|
| DE | 10 2008 017726 | 10/2009 |
| EP | 0 443 646 | 8/1991 |
| WO | WO 2008/138370 | 11/2008 |

* cited by examiner

Fig. 1: Prior art
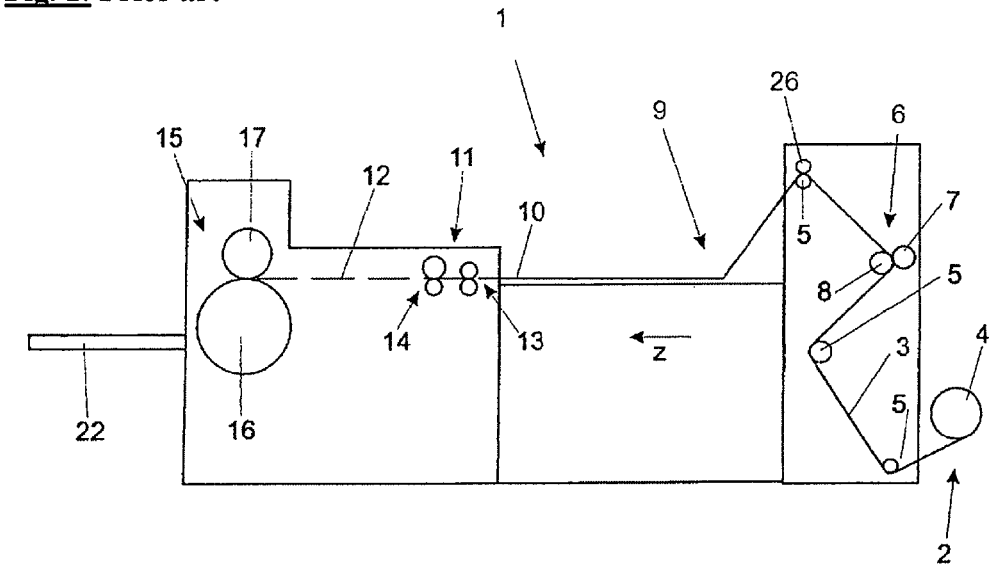
Fig. 2
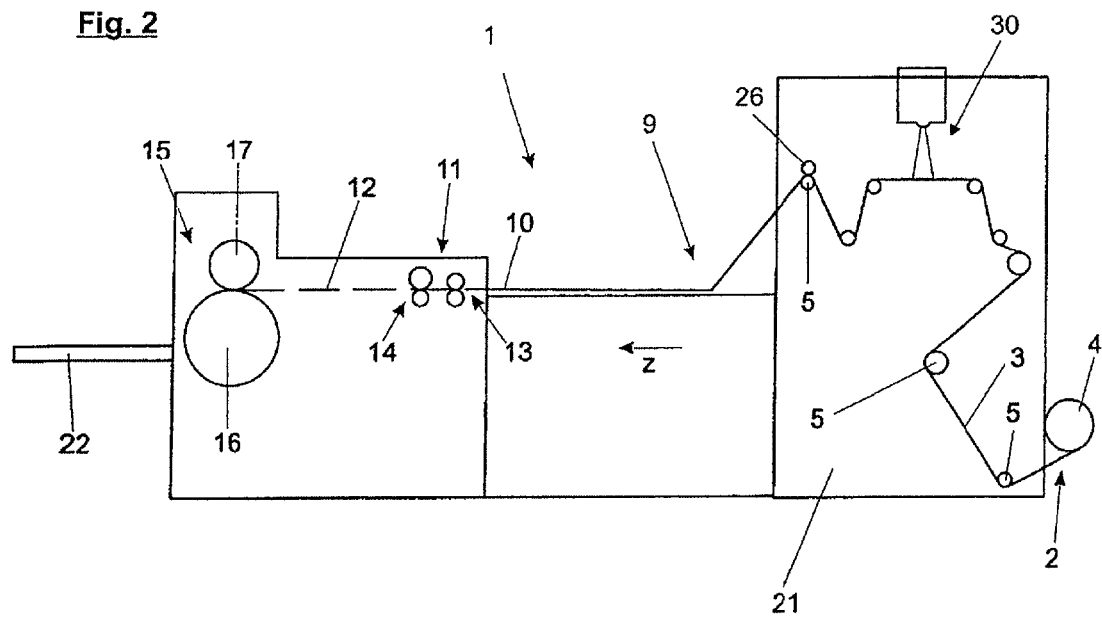

Fig. 5a:
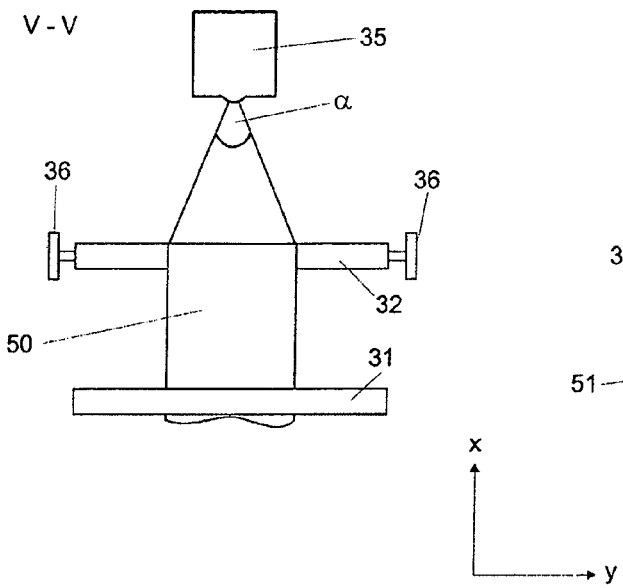
Fig. 5b:
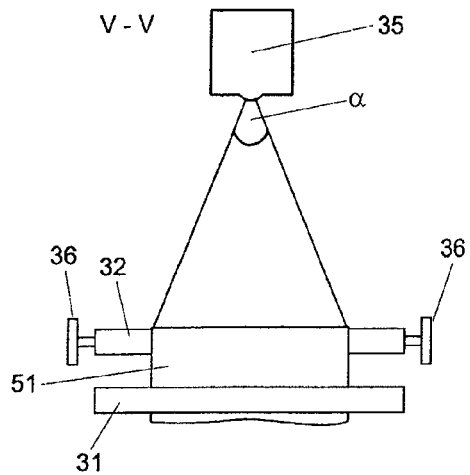
Fig. 6a: VI - VI
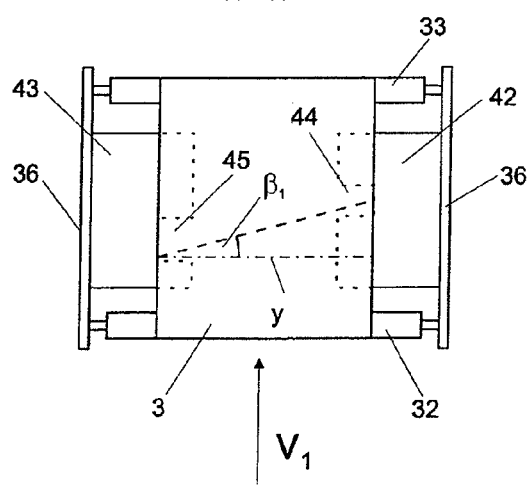
Fig. 6b: VI - VI
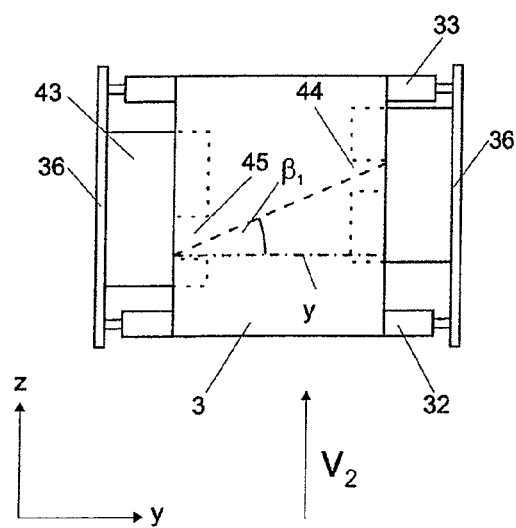

APPARATUS AND METHOD FOR PRODUCING TUBULAR SECTIONS FOR MANUFACTURING BAGS

CROSS-REFERENCE TO RELATED APPLICATIONS

This is a national stage of PCT/EP11/057844 filed May 16, 2011 and published in German, which has a priority of German no. 10 2010 029 139.0 filed May 19, 2010, hereby incorporated by reference.

BACKGROUND OF THE INVENTION

1. Field of the Invention

The invention relates to a device for generating hose sections, which essentially comprise paper to produce bags, as well as a method of producing hose sections that employs the aforementioned device.

2. Description of the Prior Art

In order to produce bags, first a web is wound off an unwinding device. This web essentially comprises paper, however sections may be provided here, for example windows made from plastic. Various perforations are inserted into the web by a perforation device. One of these perforations extends from one edge to the second edge in order to later allow that the web can be torn off along these perforations to form web or hose sections in a separating device. However, prior to this tearing process the web is generally connected to form a hose. The individual hose sections are later provided with a bottom and then form bags. The patent application DE 10 2005 052 129 of the applicant discloses such a device.

Perforation devices of prior art comprise perforating knives adjusted to the desired perforation contour, i.e. they need to be exchanged. This leads to long down times during which the machine cannot produce. Additionally, various knives and their fasteners must be provided in the warehouse for the different contours and/or widths of webs. The perforating knives are also subject to wear and tear. Neither long down times nor warehousing tools or wear and tear are desirable.

SUMMARY OF THE INVENTION

The objective of the present invention is therefore to suggest a device and a method for avoiding the above-mentioned disadvantages.

The objective is attained in a device as described herein, and in a method as described herein that employs the aforementioned device.

Accordingly it is provided that the perforation device comprises at least one laser beam device, by which at least one laser beam can be guided to the web in order to insert the perforations.

A laser beam device is characterized in emitting a strongly coherent and bundled light. Due to the above-mentioned features of the light it is very energy intensive and thus capable to remove the web material in the areas in which it impinges the web. Here, the light must be guided via one or more rapidly moving reflectors to various points of the web so that different cuts can be generated. For example, very fine perforation cuts can be produced, which after tearing off are hardly discernible as such. The bags produced in this manner are therefore very appealing.

Additionally, here frequently higher stability of the perforated material web results. This particularly applies for the use of film components.

The device improved in this manner avoids the down times for changing knives. Here, only the motion data for the reflector and/or the laser device must be stated. Based thereon, a control device controls the actuators of the reflector. Such motion data can also be calculated based on different parameters, of course. Due to the fact that different motions are possible, accordingly the contour of perforations can be designed with considerably more varieties.

Due to the fact that knives are no longer necessary any warehousing thereof is omitted. Additionally, wear and tear of knives and other components, such as the counter roll for example, are no longer relevant.

In a particularly advantageous further development of the invention it is provided that the web can be guided over at least one web guiding or web deflection device, which is adjustable in its relative position in reference to the laser beam device. In particular it is advantageous for at least the web guiding or web deflection device to be displaceable in the vertical direction.

The advantage of these further developments become obvious in the following: Using the device mentioned at the outset for generating hose sections generally hoses or webs of various widths are processed. The laser beam guided by the laser beam device on the web can only cover a certain maximum width of the web, though, because a wide adjustment range of the reflector necessary to deflect the beam would require large adjustment paths. This adjustment range is therefore limited. In case of large distances of the web from the laser beam device a wide web can also be exposed over its entire width. A short distance of the web is desirable, though, because here the beam can be better focused and thus the radiation energy can be transferred more efficiently. In order to keep the distance as short as possible and here allowing to guide the beam even over the entire width of the web it is particularly advantageous to embody the web guiding or web deflection device adjustable in its relative position in reference to the laser beam device.

In another embodiment of the invention it is provided that at least one web guiding or web deflection device comprises at least one lateral stretching element. In conventional perforation knives the web, as already mentioned, travels over a counter pressure roll. Such a counter pressure roll or a counter element of any kind is always disadvantageous when using laser light, since the latter can damage the counter element. Accordingly it is provided to keep the web at a certain stress in the lateral direction by a lateral stretching element, so that the laser light impinges a planar web. This way, a good perforation cut can be ensured. A device for adjusting or controlling the web tension serves for the same purpose, ensuring an appropriate web tension in the longitudinal direction.

In another advantageous exemplary embodiment of the invention it is provided for the web guiding or deflection device to show at least one guiding sheet or at least one guiding table. Such guiding sheets or guiding tables are capable to guide the web along a level such that good cutting results are yielded with laser light. Of course, in this arrangement it must be ensured that the laser light is prevented from damaging the above-mentioned guiding elements.

Accordingly, in another embodiment guiding sheets are provided in the areas subject to the laser light, provided with recesses. In such an arrangement it is additionally advantageous for the guiding sheets to be displaceable in reference to each other in the travel direction of the web. This is necessary when the transverse speed of the laser (thus the speed by which the laser is guided perpendicularly in reference to the travelling direction of the web) and/or the travelling speed of the web can be adjusted. As soon as the web is moved the laser beam, which is only punctual, must also be moved, at least partially, with the travelling speed of the web in its direction of transportation when a perforation cut shall be performed perpendicular in reference to the web.

It is further advantageous for the perforation device to comprise at least one suction device, in order to allow removing paper dust developing, on the one hand, as well as sections or cut-out sections, on the other hand.

Instead of web guiding or deflection devices displaceable or changeable in their position it may also be provided to implement the laser beam device adjustable in its position in reference to the web.

Additional exemplary embodiments of the invention are discernible from the present description and the claims.

BRIEF DESCRIPTION OF THE DRAWINGS

The individual figures show:
FIG. 1 a side view of a bag machine of prior art,
FIG. 2 a side view of a first embodiment of a device according to the invention,
FIG. 3 a side view of a second embodiment of a device according to the invention,
FIG. 4 a detail of a perforation station of FIGS. 2 and 3,
FIG. 5a a view V-V of FIG. 4 with a narrow web,
FIG. 5b a view V-V of FIG. 4, however with a wide web,
FIG. 6a a view VI-VI of FIG. 4 with a slow web speed,
FIG. 6b a view VI-VI of FIG. 4 with a faster web speed,
FIG. 7 a side view of another embodiment of a device according to the invention.

DETAILED DESCRIPTION OF THE PREFERRED EMBODIMENTS

Figure 3:
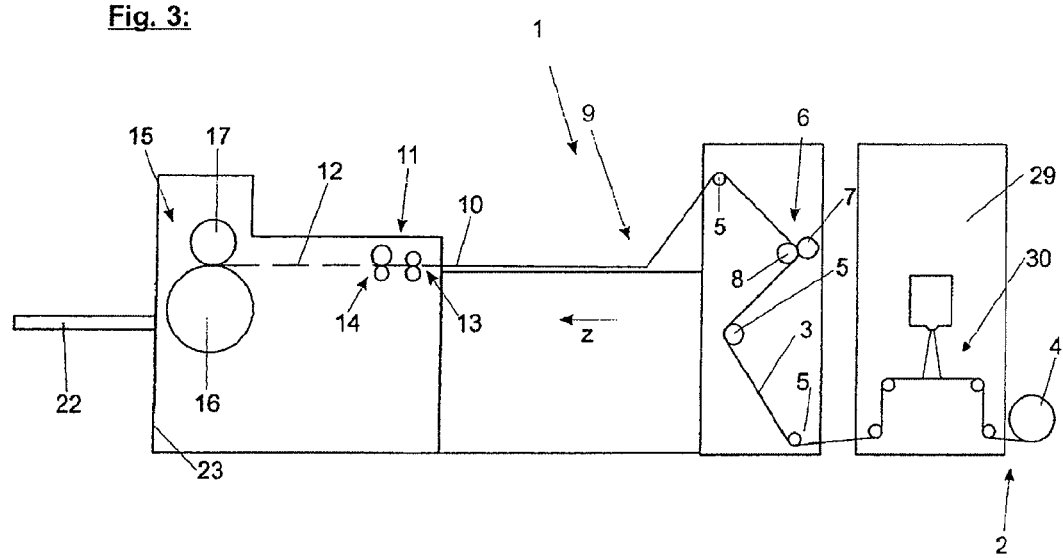

Further scope of a applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIG. 1 shows a device 1 for producing bags, as known from prior art. This figure schematically shows the essential components of this device. The device 1 comprises an unwinding device 2 in the form of an unwinding device 4, to which a material web 3 is guided. Starting from this unwinding device 4 the web 3 is fed via guiding rolls 5 to the lateral cutting station 6 and/or the perforation station 6. This station 6 comprises one or more lateral cutting or lateral perforating knives, not shown in greater detail, rotating on a roll 7. In this station 6 the material web 3 travels over a counter pressure roll 8, which serves the purpose to provide the necessary counter pressure for the cutting or perforating process. In this cutting or perforating process the web is not separated but provided with weakening cuts or perforations along which later the hose to be formed is torn for separation into hose sections. Additionally, perforations serving for a later tearing of individual, additional material sections from the hose section, may be inserted into the material web in the described station 6. For this purpose, the roll 7 may show knives at certain sections, arranged parallel in reference to each other.

Subsequently the material web 3 travels through a gap, which is formed by another guiding roll 5 and a roll embodied as a longitudinal adhesion device 26. Instead of a roll, the longitudinal adhesion device may also comprise an adhesive applying nozzle. The roll or the nozzle applies an adhesive onto a lateral section of the material web 3, in order to lastingly connect the two lateral sections to each other after the hose has been formed, as described in the following.

In the following hose forming station 9 a hose 10 is formed from the material web 3, by the web 3 being laterally folded over by guiding elements, such as guiding sheets, for example, so that the edges of the material web then overlap. The overlapping sections have already provided with an appropriate adhesive using the longitudinal adhesion device 26. During the folding over of the paper web lateral folds can also be created. The insertion of the lateral folds may also occur after the hose formation. The hose 10 is now usually guided further in the traveling direction z.

After the hose 10 has been created, it is separated in the tearing station 11 into hose sections 12. For this purpose the hose 10 is guided through the roll gap of a first pair of rolls 13. During the further progression of the hose it reaches the roll gap of a second pair of rolls 14. The rolls of the second pair of rolls show constantly or at least temporarily a greater circumferential speed than the rolls of the first pair of rolls 13, with their circumferential speed coinciding with the traveling speed of the hose 10 or being slower than it. When the next perforation has passed the roll gap of the first pair of rolls 13, seen from the preceding end of the hose, the second pair of rolls 14 engages the hose 10. This can occur by the preceding end of the hose entering the roll gap of the second pair of rolls. The rolls of the second pair of rolls 14 can also be moved relative in reference to the hose 10, for example perpendicularly, and contact the hose. When the rolls of the second pair of rolls 14 contact the hose, said hose is torn along the cut and/or the perforation.

The hose section 12 torn off the hose now reaches the bottom adhesion and/or bottom folding station 15. For this purpose, the hose section 12 is held on the bottom generating cylinder 16. Using a suitable element, for example a rod, the flap of the hose section traveling ahead, which generally is a component of the bottom projecting the top, is folded over so that parts of the bottom layer, after the folding process, rest on the exterior of the upper layer. Before that, the flap and/or the section of the exterior of the upper layer with the flap resting thereupon after the folding process are provided with an adhesive, for example glue. The adhesive application device serves for this purpose, symbolized in FIG. 1 by the glue cylinder 17.

After the bags have been produced to this extent, the bag is placed by the bottom generating cylinder onto a table 22. Here, the bags are generally arranged standing upright. Then the bags can be removed from this table 22 in stacks in an appropriate fashion.

FIG. 2 shows the device according to the invention in which the perforation station 6 of prior art has been replaced by such a perforation station 30 which processes the web 3 with a laser beam instead of a knife. This station may replace the known perforation station, for example, in the machine frame 21.

FIG. 3 shows an alternative embodiment of the perforation station 30 in the device according to the invention. Here, a separate frame 29 is provided, in which the perforation station 30, but also the unwinding device 4 are arranged. The advantage of such an arrangement is the fact that machines of prior art can be retrofitted into a device according to the invention by adding a frame 29. The design and the function of the perforation station 30 are identical, independent from their arrangement, and in the following they are explained in greater detail based on the figures.

Figure 4:
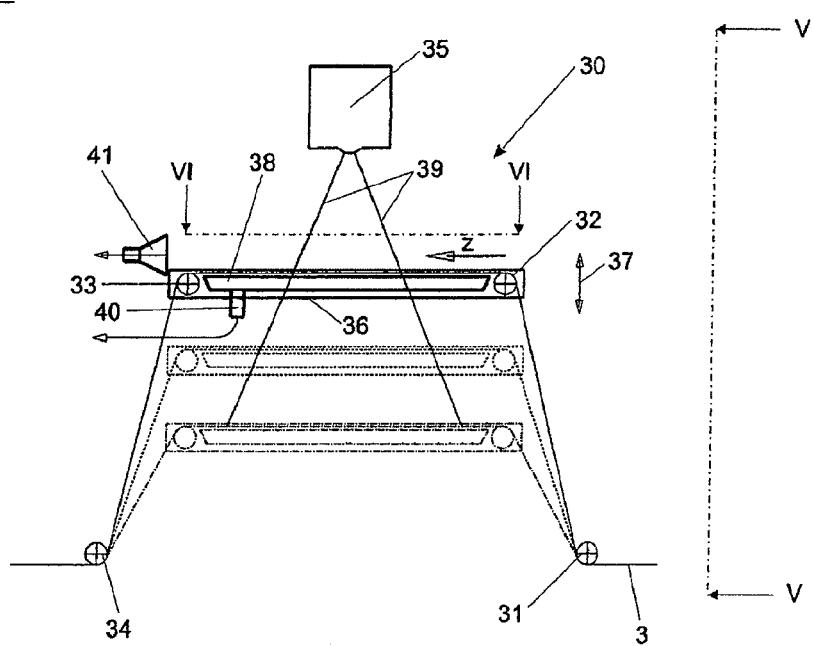

FIG. 4 shows the perforation station 30 in an enlarged view. The web 3 is first guided via a deflection roll 31 and then passes the deflection roll 32, which deflects the web 3 in a preferably horizontal level. Here, it is advantageous for the deflection roll 32 to be embodied as a laterally stretching roll in order to stretch the web 3 perpendicularly in reference to its extension such that it remains in one level. The following roll 33 is once more advantageously embodied as a laterally stretching roll acting as a deflecting roll, which guides the web to the deflection roll 34. Advantageously a laser beam arrangement 35 is arranged above the level defined by the web 3. This laser beam device 35 comprises a laser beam source and one or more reflectors, by which the laser beam 39 can be reflected to the desired position on the web. The reflector or reflectors are preferably adjustable via mechanic means. Such laser beam devices are frequently also called laser scanners. The laser beam device 35 is designed such that the laser beam can be moved in two dimensions.

The deflection rolls 32 and 33 can be supported in a frame 36, which can be displaced in reference to the laser beam device. The preferred direction of adjustment extending perpendicular in reference to the level of the web 3 is represented by the arrow 37.

The frame 36 may be supported displaceable in various rails. The height adjustment may occur by a manually or electromotive operated spindle elevator. Using the above-described height adjustment it can be ensured that the laser beam, which due to the limited ability for adjustment of the laser scanner can only scan a certain angle perpendicular in reference to the traveling direction z of the web, may also perforate it over its entire lateral direction, even in wider webs. The dot-dash lines respectively show the frame and the parts arranged thereat in positions adjusted in their height.

Furthermore, a collection bin 38 may be provided, which is also supported advantageously on the frame 36. A suction nozzle 40 may be provided at the collection bin 38 by which refuse or paper dust can be suctioned off via a suctioning device. Another suction nozzle 41 may serve the same purpose.

FIGS. 5a and 5b show the view V-V of FIG. 4, with FIG. 5 illustrating the height adjustment for a narrow web and FIG. 5b the height adjustment for a wide web. The angle α, which the laser beam 39 can scan, is always the same.

FIGS. 6a and 6b show another embodiment of the invention. The web 3 guided via the rolls 32 and 33 is additionally supported at its edges by sheets 42 and 43. The sheets show recesses 44 and 45, by which the laser beam 39 can be guided in order to prevent the sheet becoming damaged by the radiation.

At least one of the sheets can be moved in the direction of operation of the web z and opposite thereto. This way, a laser can be moved at various angles b in reference to the lateral direction y of the web. In steady traverse speeds of the laser beam this angle can be adjusted depending on the web speed v. Here, in FIG. 6a a first web speed $v_1$ is adjusted, which requires a first angle $\beta_1$. In web speeds $v_2$ greater than $v_1$ the angle $\beta_2$, which is greater than $\beta_1$ must be adjusted. Accordingly in FIG. 6b the sheet 42 was displaced in the travel direction z such that the laser beam also impinges the recess at the changed angle $\beta_2$ and abstains from damaging the sheet.

The sheet or sheets can be embodied manually displaceable. However it is beneficial for a motorized, for example an electromotive adjustment device to be provided, controllable by a control device, also controlling the laser beam.

Instead of two separated sheets, several coupled sheets may also be provided, which can be adjusted via joint adjustment mechanisms. For example, a laterally extending pivotal level may be arranged articulate at several sheets. Instead of sheets, other suitable components may also be used, suitable to support the web such that it is located in a single level. It may represent brushes or small rolls, for example.

Figure 7:
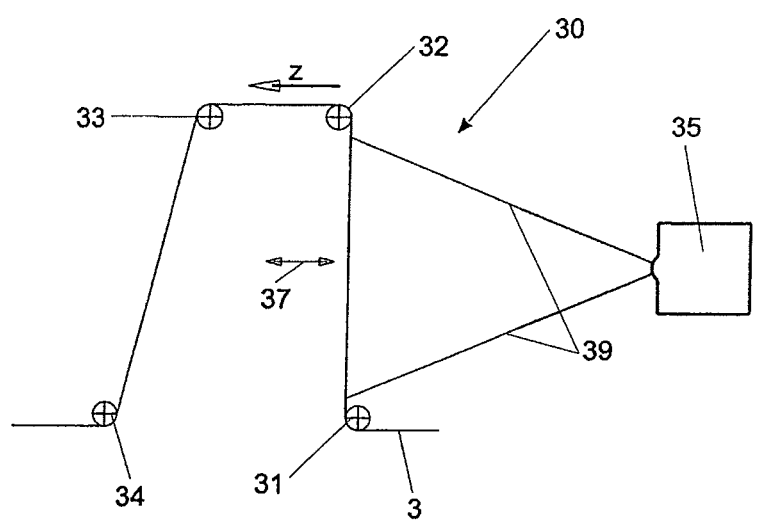

FIG. 7 shows another exemplary embodiment of the invention. In this case, the laser 35 radiates rather horizontally, with the web 3 being guided vertically. The dual arrow 37 here points in the horizontal direction. This means that the deflection rolls 31 and 32 can be changed in the horizontal direction in their position in reference to the direction of the laser beam 35. The deflection roll 33 may be supported locally fixed, however. Other arrangements of the web guiding or web deflecting devices are also possible, which can be changed in their relative position in reference to the laser beam device. Although these options are not listed in detail, they are included in the scope of the invention described in this application.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

| | List of reference characters |
|---|---|
| 1 | device for producing bags |
| 2 | unwinding device |
| 3 | material web |
| 4 | roll |
| 5 | guiding roll |
| 6 | lateral cutting station/perforation station |
| 7 | roll |
| 8 | counter pressure roll |
| 9 | hose forming station |
| 10 | hose |
| 11 | tear-off station |
| 12 | hose section |
| 13 | first pair of rolls/pair of holding rolls |
| 14 | second pair of rolls/pair of tear-off rolls |
| 15 | bottom adhesion and folding station |
| 16 | bottom generating cylinder |
| 17 | glue cylinder/folding knife |
| 18 | |
| 19 | |
| 20 | |
| 21 | machine frame |
| 22 | table |
| 23 | |
| 24 | |
| 25 | |
| 26 | longitudinal adhesion device |
| 27 | |
| 28 | |
| 29 | frame |
| 30 | perforation station |
| 31 | deflection roll |
| 32 | deflection roll |
| 33 | deflection roll |
| 34 | deflection roll |
| 35 | laser beam device |
| 36 | frame |
| 37 | Arrow (to illustrate the direction of adjustment) |
| 38 | collection bin |
| 39 | laser beam |
| 40 | suction nozzle |
| 41 | suction nozzle |
| 42 | sheet |
| 43 | sheet |
| 44 | recess |
| 45 | recess |

| List of reference characters | |
|---|---|
| α | angle |
| β₁, β₂ | angle |
| y | lateral direction |
| z | travel direction |

What is claimed is:

1. A device for generating hose sections for the production of bags said device comprising:
   an unwinding device with which a web is unwound from a roll;
   a perforation device with which perforations are inserted into the web, said perforations extending perpendicularly over the web relative to a travel direction (z) of the web,
   said perforation device including a web deflecting device having a first roller and a second roller configured to convey the web in a plane, and a laser beam device with which a laser beam is guided to insert the perforations in the web,
   with said web deflecting device being displaceable in a direction that is substantially perpendicular to the plane of the web;
   a hose generation device arranged downstream relative to the perforation device, said hose generation device placing edges of the web in an overlapping configuration so as to form a hose; and
   a separating device with which individual hose sections are separated from the hose along the perforations.

2. The device according to claim 1, wherein the web deflecting device is displaceable so as to adjust a position of the web relative to the laser beam device.

3. The device according to claim 1, wherein the web deflecting device is displaceable in a vertical direction.

4. The device according to claim 1, wherein at least one of the first roller and the second roller both conveys the web and stretches the conveyed web in a lateral direction.

5. The device according to claim 1, wherein the perforation device includes a device to regulate or control a tension of the web.

6. The device according to claim 1, wherein the web deflecting device is housed in a frame that is displaceable in the direction that is substantially perpendicular to the plane of the web.

7. The device according to claim 1, wherein the web guiding device includes at least two guiding sheets that support the web at edges thereof, said at least two guiding sheets having recesses therein in areas impinged by the laser beam, with at least one of the guiding sheets being displaceable in the travel direction (z) of the web.

8. The device according to claim 1, wherein the perforation device includes at least one suction device.

9. The device according to claim 1, wherein the laser beam device is displaceable relative to the web.

10. The device according to claim 1, wherein the bags include a material of construction that is paper.

11. The device according to claim 1, wherein the web is a paper web.

12. The device according to claim 1, wherein the web deflecting device is configured such that the plane of the conveyed web is substantially horizontal.

13. A method of producing hose sections of bags, said method comprising:
   unwinding a web from a roll with an unwinding device;
   guiding the unwound web with a deflecting device having a first roller and a second roller configured to convey the web in a plane, with said web deflecting device being displaceable in a direction that is substantially perpendicular to the plane the deflected web;
   perforating the deflected web with a perforation device that includes a laser beam device with which a laser beam is guided to insert the perforations in the web, with the perforations extending at least in a direction perpendicular (y) relative to a travel direction (z) of the web;
   overlapping edges of the perforated web to form a hose in a hose forming device arranged downstream relative to the perforation device; and
   separating the hose along the perforations with a separating device so as to produce a plurality of individual hose sections.

14. The method according to claim 13, further comprising displacing the web deflecting device so as to adjust a position of the web relative to the laser beam device.

* * * * *